Nov. 2, 1965 M. J. E. GOLAY 3,215,981

SIGNAL PROCESSING SYSTEM

Filed Oct. 31, 1960 6 Sheets-Sheet 1

INVENTOR.
MARCEL J. E. GOLAY
BY
Robert D. Sanborn
ATTORNEY

Nov. 2, 1965 M. J. E. GOLAY 3,215,981

SIGNAL PROCESSING SYSTEM

Filed Oct. 31, 1960 6 Sheets-Sheet 2

INVENTOR.
MARCEL J. E. GOLAY
BY Robert D. Sanborn
ATTORNEY

Nov. 2, 1965 M. J. E. GOLAY 3,215,981

SIGNAL PROCESSING SYSTEM

Filed Oct. 31, 1960 6 Sheets-Sheet 3

INVENTOR.
MARCEL J. E. GOLAY
BY Robert D. Sanborn
ATTORNEY

INVENTOR.
MARCEL J. E. GOLAY
BY
Robert D. Sanborn
ATTORNEY

Nov. 2, 1965 M. J. E. GOLAY 3,215,981

SIGNAL PROCESSING SYSTEM

Filed Oct. 31, 1960 6 Sheets-Sheet 5

INVENTOR.
MARCEL J.E. GOLAY
BY
Robert D. Santon
ATTORNEY

INVENTOR.
MARCEL J. E. GOLAY
BY Robert D. Sanborn
ATTORNEY 3,215,981
SIGNAL PROCESSING SYSTEM
Marcel J. E. Golay, Rumson, N.J., assignor, by mesne assignments, to Philco Corporation, Philadelphia, Pa., a corporation of Delaware
Filed Oct. 31, 1960, Ser. No. 66,004
16 Claims. (Cl. 340—146.3)

The present invention relates to improvements in filter systems and more particularly to improvements in matched filters of the tapped delay line type.

Matched filters or signal correlators of the tapped delay line type are used in communication systems, character recognition systems and the like to separate one or more signals having preselected characteristics from a composite signal which may include other signals and/or random noise in addition to the desired signal.

Generally a matched filter or signal correlator of this type comprises a delay line provided with input terminals at one end to which the composite signal may be supplied, a matched or nonreflective termination at the other end and taps or other provisions for making connections to the delay line at a plurality of points between the two ends thereof. In some instances a parallel shift register which has a similar plurality of output taps may be employed in place of the delay line. The number of taps required will depend upon the complexity of the signal or signals to be recognized and the degree of difference between the waveform of these signals to be recognized and the waveform of other signals which may be present also. Tens of taps may be sufficient for a simple character recognition system which will encounter only a limited number of characters. A secret communication system may require a delay line having hundreds or thousands of taps. Selected combinations of these taps are connected to one or more busses or output circuits, the taps being selected so that one response is provided by one of the output circuits if the corresponding desired signal is supplied to the input terminals and no significant response is provided if the desired signal is not present. If one or more of the signals to be recognized change for any reason, it is necessary to change the connections from the taps on the delay line to the output circuits.

In the past it has been necessary to determine in advance from an analysis of the characteristics of the signal, or by prearrangement at the receiver and transmitter of a communications system, the connections which must be made between the various taps of the delay line and the output circuits in order to detect the desired signals. In prior art delay line filters the selected connections thus determined are made by means of toggle switches, printed commutator cards, punch card commutators, or the like. The steps of first determining the connections which must be made and then actually making these connections manually or semiautomatically by one of the means mentioned above are both tedious and time-consuming. Further it is not feasible to reset the matched delay line filters of the prior art frequently to accommodate changes which may occur in the signal to be recognized. If the initial selection of the taps is such that both the selected signals in their expected form and substantial modifications of these signals will be recognized, there is the danger that unwanted signals will cause the filter to provide a recognition signal. If the initial selection of the taps is such that only the original signals will be recognized, there is the danger that the desired signals will not be recognized if there is some gradual change in the nature of these signals due to thermal drift in the generator or other changes resulting in degeneration of the signals in the generating circuit. This difficulty could be avoided if the tapping could be reorganized rapidly to compensate for slow changes in form of the selected signal.

Therefore it is an object of the present invention to provide means for rapidly reorganizing the coupling arrangement between two circuits.

A further object of the present invention is to provide means for rapidly reorganizing the tapping arrangement between a tapped delay line or other equivalent signal translating circuit and one or more output circuits.

An additional object of the invention is to provide means for selecting as well as connecting the taps of a signal translating circuit to one or more output circuits.

It is a further object to provide means controlled by the signal to be processed for connecting selected taps of a multiply tapped signal translating circuit to an output bus.

Still another object of the present invention is to provide means controlled by a signal indicating recognition of the signal being processed for altering at selected intervals the connections between the taps of a multiply tapped delay line filter and an output bus without interference with the normal operation of the filter.

In general these and other objects of the present invention, which will become apparent as the description of the invention proceeds, are achieved in one preferred form by providing a coupling means between each tapped portion of a delay line and one or more more output busses. From here on the description of this invention will be made as if there were only one bus or set of busses to recognize one signal, albeit it will be understood that many couplings could be provided from each tapped point to different output busses or bus sets for the recognition of as many signals.

A control means is provided for each coupling means for resetting the coupling means in a selected one of a limited number of states. The control means may, for example, set the coupling means to one of the two states for the purpose of tapping the delay line positively or negatively by a fixed amount although it is to be understood that more elaborate circuits could serve to tap the delay line in positive or negative amounts of varying magnitude, or occasionally not to tap it at all.

The control means is made jointly responsive to an intermittently applied control signal and the potential produced at an associated tap by the desired signal previously fed to the delay line at the instant the control signal is applied. The tap may be the same tap to which the associated coupling means is connected or another tap. In one embodiment of the invention the presence of a recognition signal on the output bus initiates the application of the control signal to the control means.

For a better understanding of the present invention together with other and further objects thereof, reference should now be made to the following detailed description which is to be read in conjunction with the accompanying drawings in which.

Figures 1, 1A, 1B, 3:
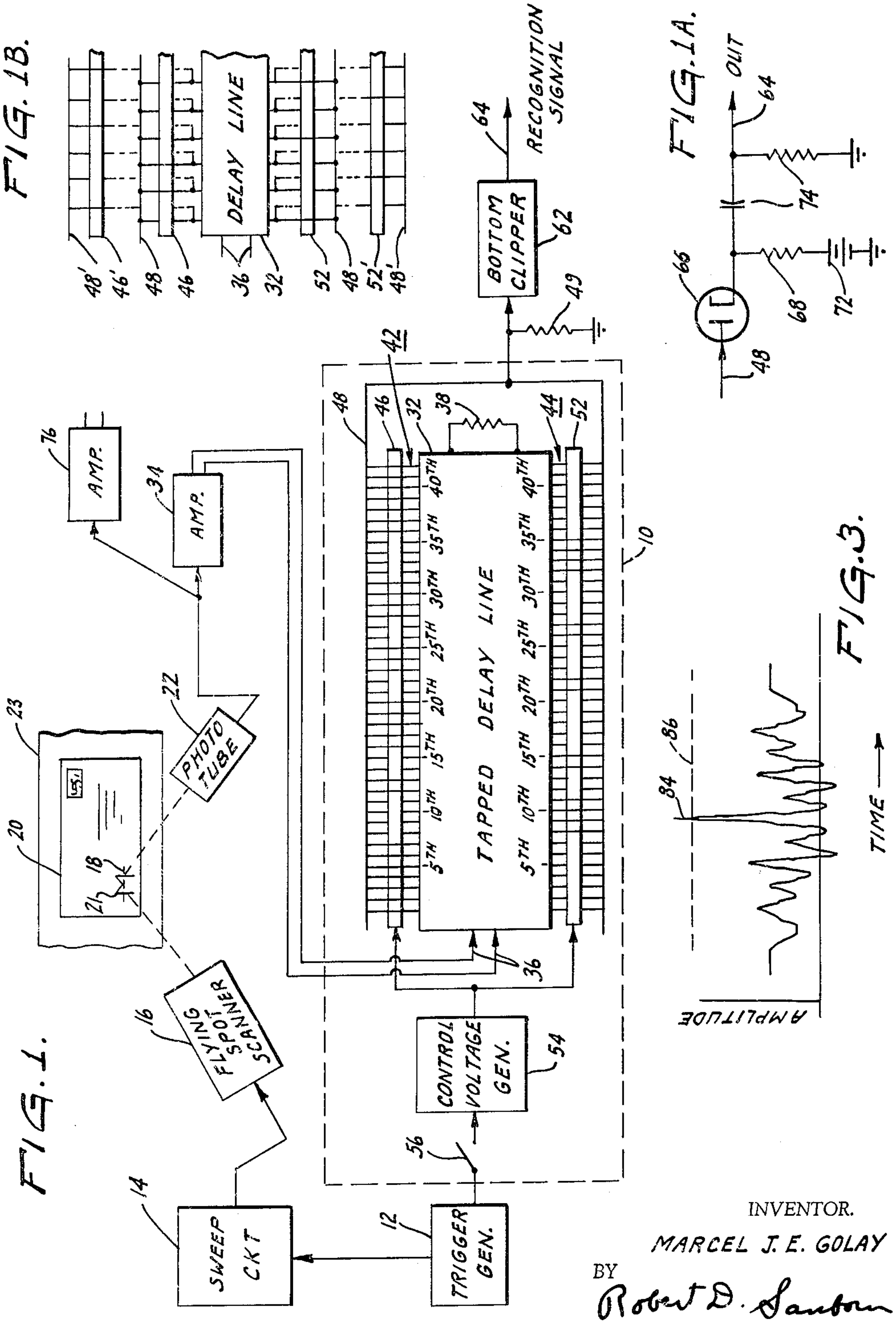
FIG. 1 is a block diagram of a character recognition system which includes a matched filter.
FIG. 1A is a schematic diagram of a portion of the system of FIG. 1.
FIG. 1B is a fragmentary view showing a possible modification of the system of FIG. 1.
FIG. 3 is a plot representative of the output signal of the system of FIG. 1.

The block diagram of FIG. 1 illustrates a typical character identification system which employs a tapped delay line matched filter circuit. The present invention is concerned only with the circuits included within the broken line 10. However the entire character recognition system will be described briefly in order that the purpose and operation of the invention may be more readily understood.

A trigger generator 12 supplies a periodic series of pulses to a sweep circuit 14 of flying spot scanner 16. Sweep circuit 14 causes the beam of flying spot scanner 16 to scan along a path 18 on a character carrying object 20. It will be assumed that object 20 is a white envelope having opaque character 21 marked thereon and that phototube 22 measures the variation in light reflected from the envelope as the beam of flying spot scanner 16 scans across the character 21. In the following example it will be assumed that object 20 is carried by a conveyer belt 23 which moves intermittently to place a succession of documents, such as envelope 20, in a position to be scanned by flying spot scanner 16. It will be assumed further that the system of FIG. 1 is to provide a recognition signal each time the document bears the letter M.

Figure 2:
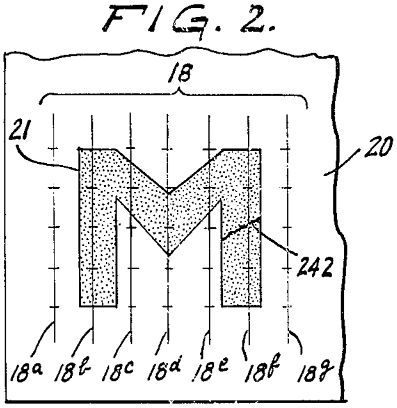
FIG. 2 is a fragmentary view of the scanned object of FIG. 1.

FIG. 2 shows in more detail a portion of the character carrying object 20 having in this instance the character M formed thereon. The path of the beam of flying spot scanner 16 is again represented by raster 18 in FIG. 2. This raster comprises seven vertical lines $18^a$–$18^g$, which are scanned in succession at a predetermined rate with rapid retrace of the scanning beam between lines.

Turning once again to FIG. 1, the output of phototube 22 is supplied by way of amplifier 34 to the input 36 of delay line 32. Delay line 32 preferably has two input terminals which are balanced with respect to ground. For this reason the connection between amplifier 34 and delay line 32 is shown as a double line.

Delay line 32 is provided with a matched or nonreflective termination 38. For convenience it will be assumed that the delay period of delay line 32 is equal to the time required by flying spot scanner 16 to scan the entire raster 18.

Delay line 32 is a multisection delay line having a pair of taps for each section. Because of the balanced nature of the delay line, the two taps of each pair will be at opposite polarities with respect to ground. In FIG. 1, one tap from each section is shown at the top of delay line 32. These taps are identified collectively by the group number 42.

A switching network 46 is provided which connects the taps of group 42 to an output bus 48. The taps of group 44 are connected to the same output bus 48 by a second switching network 52. The impedance from bus 48 to ground is schematically represented by resistor 49. In prior art systems switching networks 46 and 52 may be toggle switches, printed wiring commutator cards, punched tape commutator cards or the like. In considering the operation of the system of FIG. 1 it will be convenient to think of switching networks 46 and 52 as banks of single pole, single throw toggle switches, one switch being provided for each of the taps in groups 42 and 44. Each switch in one of its operative position connects the associated tap on delay line 32 to output bus 48. In the other operative position of the switch the tap on delay line 32 is disconnected from the remainder of the circuit. It will be convenient to assume that each switch associated with a tap of group 42 is ganged to the switch associated with the corresponding tap in group 44 so that only one tap of each pair associated with output bus 48 is connected to bus 48 at any time.

The output bus 48 is connected through a bottom clipper 62 to an output signal line 64. Bottom clipper circuits are well known in the art and require no detailed description. However, by way of example, a suitable bottom clipper circuit is shown in FIG. 1A. This circuit comprises a diode 66 which has its cathode biased positively with respect to ground by a resistor 68 and a bias source 72. The output bus 48 is connected to the anode of diode 66. Thus no signal will be passed from output bus 48 to the cathode of diode 66 until this bus is more positive than the bias supplied by source 72. The cathode of diode 66 is connected to output connection 64 by way of a resistor capacitor coupling network 74.

As will be explained in more detail presently, the circuit of FIG. 1 will produce an output signal whenever a signal of preselected waveform is supplied to input terminals 36. The path 18 is selected so that this signal is generated only when a preselected character is scanned by flying spot scanner 16. If more than one character is to be identified additional sets of coupling means may be associated with the taps 42 and 44 as shown in FIG. 1B. Switching networks 46' and 52' may be identical to networks 46 and 52 but are generally set differently than networks 46 and 52 so that recognition signals are produced on output busses 48 and 48', respectively, by different signals supplied to input terminals 36 of delay line 32. Alternatively the output of phototube 22 may be supplied to a plurality of amplifiers, one additional amplifier being shown at 76. Each of these additional amplifiers will supply a signal to a matched filter network of the type enclosed within the broken line 10. The matched filter networks may be identical except that normally different taps of the groups 42 and 44 will be connected to the respective busses 48. One control voltage generator 54 must be provided for each filter.

Figure 2A:
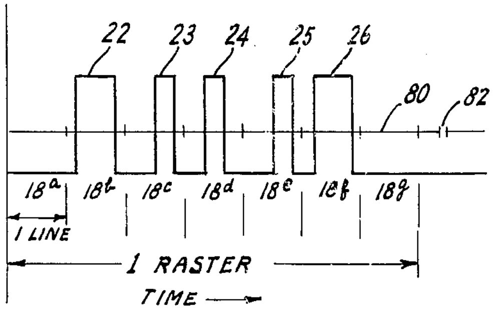
FIG. 2A is a representation of the waveform produced by the scanning.

Suppose now that the matched filter enclosed within the broken line 10 is to be set to provide a recognition signal when the block letter M of FIG. 2 is scanned along raster 18 but no such signal if any other letter is scanned. FIG. 2A is a plot of the binary or quantized representation of the signal generated by this scanning. The time scale 80 of FIG. 2A is calibrated so that each interval 82 corresponds to the delay introduced by one section, that is, the delay between adjacent taps, of delay line 32. It is assumed that there are six time intervals 82 for each line of the scan, making a total of 42 intervals 82 for the entire seven line raster 18. It is assumed also that the signal is quantized in each interval to have either the value of "zero" if, for the major part of the interval, the beam scans a white area or the value "one" if, for the major part of the interval, the beam scans an opaque or nonreflective area. It will be seen that pulses 22 and 26, which are generated during the second and sixth scanning lines, respectively, have a duration of four time units each. Pulses 23–25 have a duration of two time units each. The spacing between successive pulses is four units, respectively. It should be kept in mind that pulse 22 is the earliest pulse in the pulse train shown in FIG. 2A. Thus if the pulse train of FIG. 2A is standing on the delay line 32 of FIG. 1, pulse 22 will be nearest the termination 38 and pulse 26 will be nearest the input terminals 36.

Suppose now that the 1st to 7th, 12th, 13th, 16th–20th, 23rd–25th, 28th–31st and 36th–42nd taps of group 42 and the 8th–11th, 14th, 15th, 21st, 22nd, 26th, 27th, and 32nd–35th taps of group 44 are connected to the output bus 48 by switching networks 46 and 52. The taps are numbered in the order in which they would be reached by a signal supplied to input terminals 36. This is the arrangement shown in FIG. 1. As explained above, if a tap, for example the first tap of group 42, is connected to output bus 48, then the corresponding first tap of group 44 is not connected to bus 48.

If the waveform shown in FIG. 2A, which is generated by the scanning of the letter M, is supplied to the input terminals 36 of delay line 32 the taps which are connected to the output bus 48 will be at times positive and at times negative depending upon the position of the wave on the delay line. As a result, the negative signals on some taps will balance or offset the positive signals on the other taps connected to the output bus 48. However, since the taps on delay line 32 have been selected with the waveform of FIG. 2A in mind, at one instant following each scan of the letter M all of the taps on the delay line 32 which are connected to output bus 48 will be positive. This will occur when pulse 22 occupies the 32nd to 35th sections of delay line 32 and pulse 26 occupies the eight to eleventh sections.

FIG. 3 is a plot of the variation in potential of output bus 48 which results from the application of the waveform of FIG. 2A to the input terminals 36. It will be seen that pulse 84, which is generated when all of the taps are positive, greatly exceeds the amplitude of the remainder of the waveform of FIG. 3. If the bias supplied to cathode 66 of FIG. 1A is set at the level 86 of FIG. 3, an output signal will be produced upon the occurrence of the pulse 84 but at no other time.

The scanning path 18 is so chosen that the particular combination of pulses shown in the waveform of FIG. 2A will not be produced by the scanning of any alphabetic character other than the character M. Thus the system illustrated in FIG. 1 will provide an output signal only when the letter M is scanned. It should be noted that slight horizontal or vertical shifts of the raster with which the letter M is scanned will not alter appreciably the signal generated by this scanning, so that the letter M will be recognized regardless of such slight shifts.

In document identifying systems of the type just described, it is necessary to reset the taps of the delay line 32 each time a new character is to be recognized or each time the type font of the character is changed.

The means whereby the taps on the delay line may be changed rapidly to conform to the present makeup of the signal to be detected are shown in detail in FIG. 4 which will now be described.

Figure 4A:
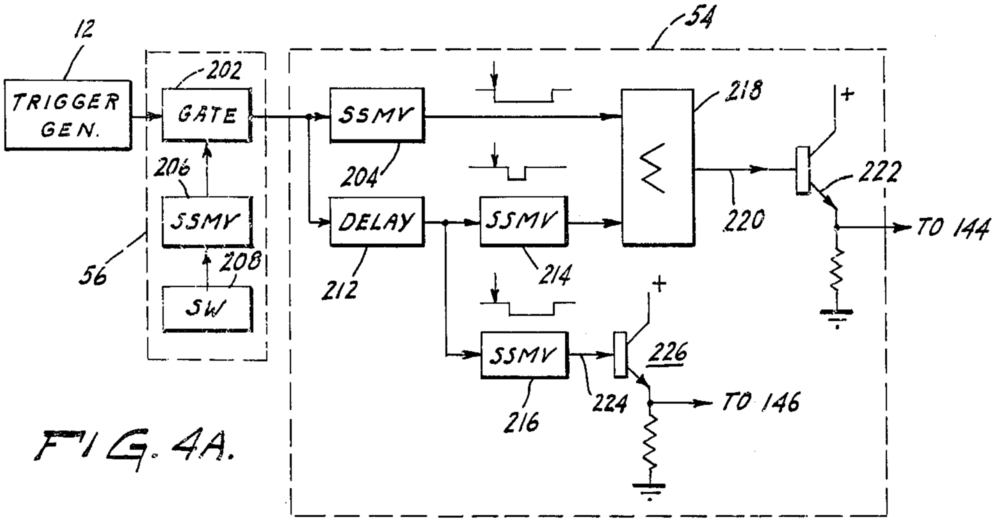
FIG. 4A is a detailed block diagram of selected portions of FIG. 4.
Figure 4:
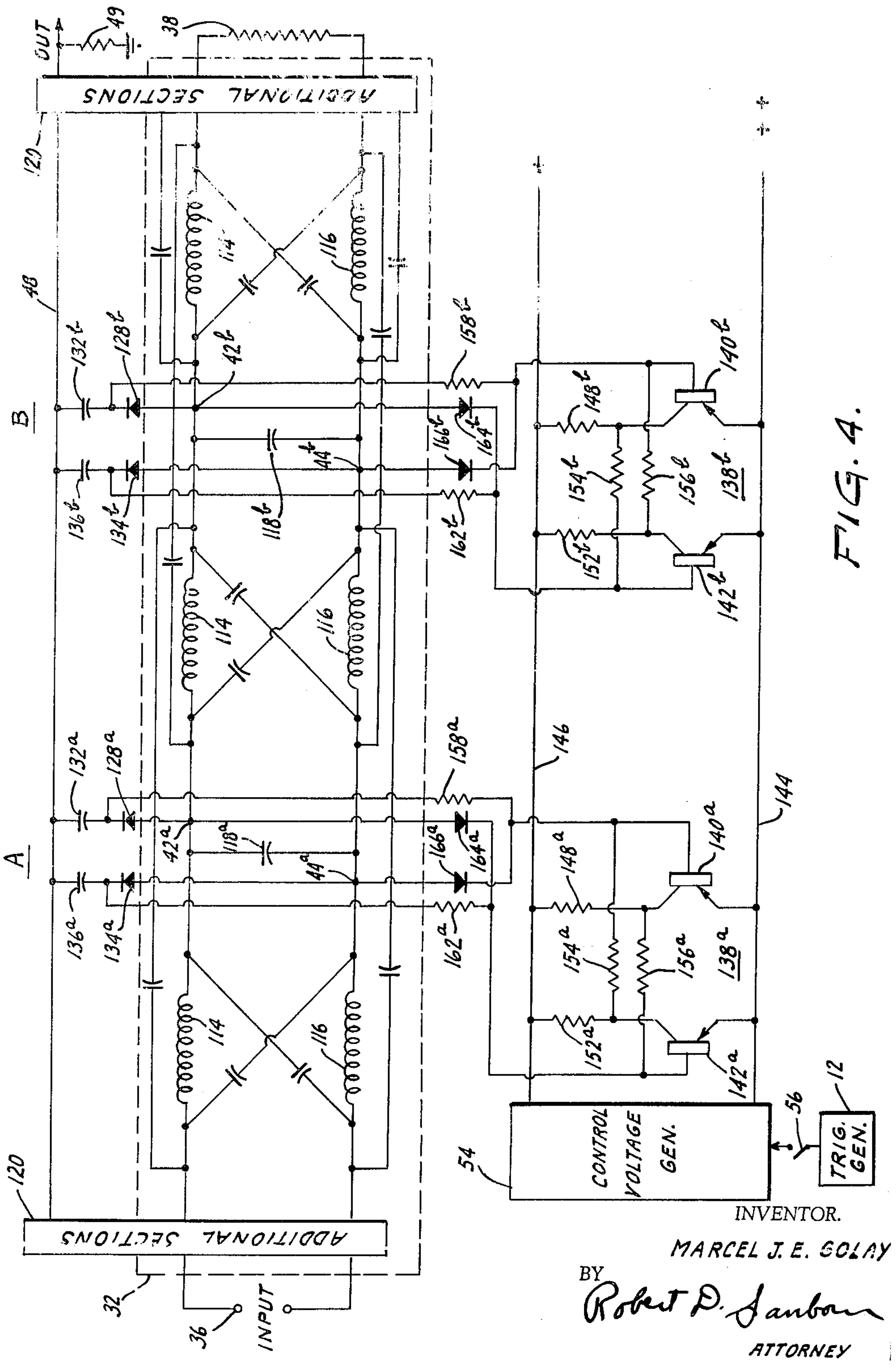
FIG. 4 is a schematic diagram partially in block form of a preferred embodiment of the present invention.

In FIG. 4 input terminals 36, termination 38 and output bus 48 correspond to similarly numbered elements in FIG. 1. The delay line 32 of FIG. 4 is shown formed of series inductors 114 and 116, shunt capacitors 118 and phase correcting capacitors 119. Only two sections are shown in full detail since all sections may be of identical construction. It is indicated that all sections are tapped whereas in other embodiments of the invention it is found preferable to tap every other section only. The additional sections are diagrammatically represented by blocks 120. In the following description the sections shown in detail are identified as sections A and B. As mentioned above, character recognition systems may typically employ tens of delay line sections while typical communication systems may employ hundreds or thousands of sections. While only lumped constant delay lines will be described herein, it is to be understood that other forms of tapped delay lines, such as tapped acoustic delay lines (either solid or liquid) or tapped distributed constant delay lines may be employed instead. In addition, parallel binary shift registers in which a signal is periodically shifted in one direction past a given set of output taps may be employed in place of the delay device.

The taps 42^a and 42^b in FIG. 4 correspond to taps in group 42 of FIG. 1. Similarly taps 44^a and 44^b correspond to taps in group 44. The connection between tap 42^a of delay line 32 and output bus 48 is made by way of a capacitive network comprising variable capacitance diode 128^a and blocking capacitor 132^a. As will be explained in more detail presently, diode 128^a is always back biased; however, the amount of back bias will be varied to cause taps 42^a to be strongly coupled to output bus 48 or to be weakly coupled to this bus as the situation demands. Variable capacitance diodes having a capacitance change of the order of at least 4-to-1 with changes in applied bias voltage are available. A similar coupling network comprising variable capacitance diode 134^a and capacitor 136^a is provided for connecting the tap 44^a to the output bus 48. As explained above, only one of the two taps 42^a and 44^a is strongly coupled to the output bus 48 at any one time.

The switching bias for variable capacitance diodes 128^a and 134^a is provided by a bistable circuit 138^a. The bistable circuit 138^a shown by way of example in FIG. 4 includes two transistors 140^a and 142^a. The emitters of transistors 140^a and 142^a are connected to a bus 144. The collector of transistor 140^a is connected to a second bus 146 by way of collector resistor 148^a. Similarly a resistor 152^a is connected between bus 146 and the collector of transistor 142^a. A second resistor 156^a is connected between the collector of transistor 140^a and the base of transistor 142^a. The cathode terminal of diode 128^a is connected to the collector of transistor 142^a by way of resistor 154^a and a second resistor 158^a. The cathode terminal of diode 134^a is connected to the collector terminal of transistor 140^a by way of resistor 156^a and resistor 162^a.

A diode 164^a is connected from terminal 42^a of the delay line to the base of transistor 142^a. A diode 166^a is similarly connected from the terminal 44^a to the base of transistor 140^a. Diodes 164^a and 166^a are made operative intermittently to set bistable circuit 138^a to a selected state.

Section B is identical to section A just described. Therefore like parts have been identified with like reference numerals, the superscript "*a*" being replaced in each instance with the superscript "*b*."

Figure 5:
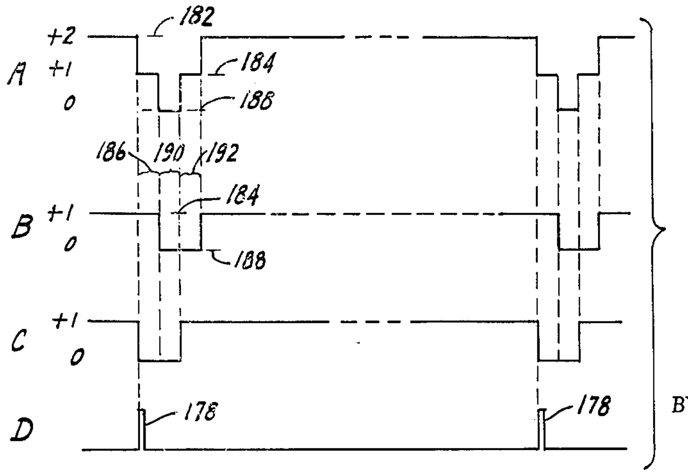
FIG. 5 is a series of waveforms which represent signals present at various points in the circuit of FIG. 4.

The control voltage generator 54 of FIG. 4 corresponds to the similarly numbered element of FIG. 1. Generator 54 is activated by a single trigger pulse supplied by way of gate or switch 56 each time the tapping arrangement is to be reorganized. Waveform A of FIG. 5 is a time versus voltage amplitude plot of the potential supplied to bus 144 by generator 54. The units of amplitude in waveform A are arbitrarily chosen and are given merely to show the relationship between the potential on bus 144 and the potential on bus 146. The potential supplied to bus 146 by control voltage generator 54 is represented by waveform B in FIG. 5. Waveform C in FIG. 5 represents a difference between waveform A and waveform B and therefore the potential difference which exists between bus 144 and bus 146. As shown at A in FIG. 5, the potential at bus 144 is normally at some relatively high potential represented by the level 182. Upon the occurrence of a trigger signal 178, shown in waveform D of FIG. 5, the potential at bus 144 is reduced to a lower amplitude level 184 during a time interval 186. By way of illustration level 184 is taken to be one half the original amplitude level 182. For reasons which will become clear presently, level 184 is more positive than the highest amplitude positive peak of the signal to be supplied to delay line 32. During the interval 190 which follows interval 186 the potential at bus 144 is further reduced to level 188 which is preferably at zero or ground potential. In interval 192, which follows interval 190, the potential at bus 144 is again increased to level 184. Following interval 192, the potential at bus 144 rises to the original level 182 and remains there until the next trigger pulse is supplied to control voltage generator 54. A trigger pulse is supplied to control voltage generator 54 only when a change is to be made in the coupling arrangement between the taps 42 and 44 and the output bus 48.

As shown at B in FIG. 5, the potential on bus 146 is normally at level 184 and remains at this level during interval 186. During intervals 190 and 192, the potential on bus 146 is reduced to level 188 or ground potential. Following interval 192 the potential of bus 146 returns to its original level 184. Intervals 186, 190 and 192 are shown as being equal in FIG. 5. However, this is not essential to the proper operation of the present invention. The duration of interval 190 will depend upon the time required to reset the bistable circuit 138 of FIG. 4. This can be accomplished in conventional circuits in a few microseconds and in certain high speed computing circuits in a fraction of a microsecond.

The control voltage generator 54 is shown in block form in FIG. 4 since it may take any one of several well-known forms within the scope of the present invention. However, by way of specific example, a more detailed block diagram of a control voltage generator which may be employed in the circuit of FIG. 1 is shown in FIG. 4A. The trigger generator 12 shown in FIG. 4A corresponds to the similarly numbered element in FIG. 1. Switch 56, which was diagrammatically shown in FIGS. 1 and 4 as a simple single throw switch, comprises a gate circuit 202 which connects the output of trigger generator 12 to the input of a single shot multivibrator 204. Gate 202 is controlled by a second single shot multivibrator 206 which is controlled in turn by switch 208. Switch 208 is a momentary contact switch which is connected to initiate a cycle of single shot multivibrator 206. Multivibrator 206 produces a pulse which is equal to or slightly longer than a repetition period of trigger generator 12. As a result, one, or at the most two, trigger pulses from generator 12 are supplied to single shot multivibrator 204 for each actuation of switch 208. Single shot multivibrator 204 produces a pulse having an amplitude equal to the difference between levels 182 and 184 of FIG. 5 and a duration equal to the sum of the intervals 186, 190 and 192. This pulse is initiated immediately upon the receipt of a trigger signal from generator 12.

The output of gate circuit 202 is supplied also to the input of a delay network 212 which has a time delay equal to interval 186 of FIG. 5. The output of delay network 212 is supplied to the input of two single shot multivibrators 214 and 216. Multivibrator 214 generates a pulse having an amplitude equal to the difference between levels 184 and 188 in waveform A of FIG. 5 and a duration equal to interval 190. An adder network 218, which is connected to the outputs of multivibrators 204 and 214, combines the two signals supplied thereby and supplies it to the input terminal 220 of an emitter-follower stage 222. Stage 222 acts as a buffer between the output 220 of adder 218 and the bus 144. Adder 218 may be a simple resistive adder network of the type commonly employed in audio mixers or similar application.

Multivibrator 216 preferably provides an output pulse having an amplitude equal to that provided by multivibrator 214 but a time duration equal to the sum of intervals 190 and 192. The output 224 of multivibrator 216 is connected to the input of a second emitter-follower buffer stage 226. The output of stage 226 is connected to bus 146. If a system of the type shown in FIG. 1 employs more than one matched filter network 10, each may have its separate control voltage generator 54 and switch 56 as shown in FIG. 4A or, if all filters are to be reset at the same time, one control voltage generator may supply operating potentials to all bistable circuits corresponding to circuits 138 through suitable buffers.

The operation of the circuit of FIG. 4 will now be explained. Suppose that busses 144 and 146 are at the levels 182 and 184, respectively, of FIG. 5. Suppose also that the bistable circuits 138$^a$ and 138$^b$ have been set in some manner so that the transistors 140$^a$ and 140$^b$ are conducting and transistors 142$^a$ and 142$^b$ are cut off. The collectors of transistors 140$^a$ and 140$^b$ will be at a potential near that of bus 144 while the collectors of transistors 142$^a$ and 142$^b$ will be at a potential near that of bus 146. It will be seen that diodes 166$^a$, 166$^b$, 164$^a$ and 164$^b$ are back biased by an amount greater than the maximum amplitude of the signal appearing at taps 44 and 42, respectively. Therefore any signals coupled through the relatively low capacitance represented by these diodes will not affect the setting of the bistable circuits 138. The diodes 128$^a$ and 128$^b$ will be back biased by an amount only slightly greater than the amplitude of the signals passing down delay line 32 due to their connection to the collectors of transistors 142$^a$ and 142$^b$, respectively. Diodes 128$^a$ and 128$^b$ are selected to have a relatively high capacitance when only slightly back biased. As a result, there is a relatively high degree of coupling between terminals 42$^a$ and 42$^b$ and output bus 48 by way of the capacitive networks comprising diode 128$^a$ and capacitor 132$^a$ in series for section A and diode 128$^b$ and capacitor 132$^b$ in series for section B.

The diodes 134$^a$ and 134$^b$ will be back biased by substantially the potential on bus 144. This bias is sufficient to reduce the capacitance of diodes 134$^a$ and 134$^b$ to a relatively low value. Therefore there will be relatively little coupling between terminals 44$^a$ and 44$^b$ and output bus 48.

As suggested above, one of the major advantages of the system of FIG. 4 over prior art devices is that the appropriate coupling arrangements between taps 42$^a$, 42$^b$, 44$^a$, 44$^b$ and the output bus 48 may be made electronically without any prior analysis of the signal to be recognized. This is accomplished in the following manner. Suppose that the delay line 32 has a delay exactly equal to the pulse repetition period of trigger generator 12 and that one input signal is generated during each repetition period of generator 12. Suppose further that the signal to be recognized is being applied to input terminals 36 during each repetition period. This may be accomplished in a character recognition system of the type shown in FIG. 1, for example, by manually positioning the character to be recognized in front of the flying spot scanner 16. If a trigger pulse is now supplied to control voltage generator 54 by way of switch 56, the intervals 186, 190 and 192 of FIG. 5 will occur at a time when the signal to be recognized is standing on delay line 32. Suppose that the nature of this signal is such that a terminal 42$^a$ of the delay line of FIG. 4 is positive while the terminal 42$^b$ is negative.

Considering for a moment only the section A, it will be seen that when the potential on bus 144 drops to level 184 during interval 186, the two busses 144 and 146 are at the same potential and all bias potential is removed from the bistable circuit 138$^a$. Diodes 164$^a$ and 166$^a$ are both back biased by the positive potential of busses 144 and 146. During interval 190, the two busses 144 and 146 will drop to approximately ground potential. This removes the back bias from diodes 164$^a$ and 166$^a$. The diode 166$^a$ will still be back biased owing to the negative potential of terminal 44$^a$ of section A. However, diode 164$^a$ will be forward biased by the potential of the tap 42$^a$. At the start of interval 192 the potential of bus 144 is increased to level 184. This reestablishes the bias supply to the bistable circuit 138$^a$. In the circuit 138$^a$ transistor 142$^a$ will be cut off by the positive potential supplied by way of diode 164. The base of transistor 140$^a$ will be negative with respect to the emitter so that this transistor will be conducting. If bus 144 is now raised to level 182 and bus 146 is simultaneously raised to level 184, the net bias supplied to the bistable circuit 138$^a$ will remain the same and no change in the condition of conduction of this circuit will occur. However, both diodes 164$^a$ and 166$^a$ are now back biased so that no further change in the condition of conduction of bistable circuit $138^a$ can occur due to any signal passing down delay line 32. Since the collector of transistor $140^a$ is now at a relatively high positive potential due to the fact that this transistor is conducting, the diode $134^a$ will have a relatively high degree of back bias supplied thereto. Therefore there will be little coupling between terminal $44^a$ and output bus 48. Diode $128^a$, on the other hand, is back biased by a relatively slight amount owing to the fact that the collector of transistor $142^a$ is less positive than the collector of transistor $140^a$. Therefore diode $128^a$ has a relatively high capacitance and there will be a relatively high degree of coupling between terminal $42^a$ and output bus 48.

Considering now section B of FIG. 4, it will be seen that the operation of this circuit will be substantially the same except that during the resetting operation diode $166^b$ is forward biased by the positive signal at tap $44^b$ while diode $164^a$ is back biased due to the negative potential of terminal $42^b$. As a result, transistor $140^b$ is cut off and transistor $142^b$ is conducting. This results in diode $134^a$ being back biased by only a slight amount whereas diode $128^a$ is back biased by a relatively large amount. Therefore terminal $44^b$ is coupled to output bus 48 rather than terminal $42^b$.

Once the coupling arrangement of the circuit of FIG. 4 has been reorganized in the manner just described, signals representing characters at random may be supplied to input terminals 36 and output bus 48 will then be at its most positive potential only when the input signal supplied to terminal 36 corresponds to the one employed in establishing the coupling arrangement.

To summarize, the coupling arrangement between the taps on the delay line 32 and output bus 48 will be set to match the signal standing on the delay line at the instant a trigger signal is supplied by trigger circuit 12 to control voltage generator 54. The circuit 10 will then produce its maximum output signal whenever the signal employed in establishing the selected coupling arrangement has been reapplied to the input terminals 36 and the leading edge thereof has traveled substantially along the whole length of delay line 32.

Figures 6, 7, 8:
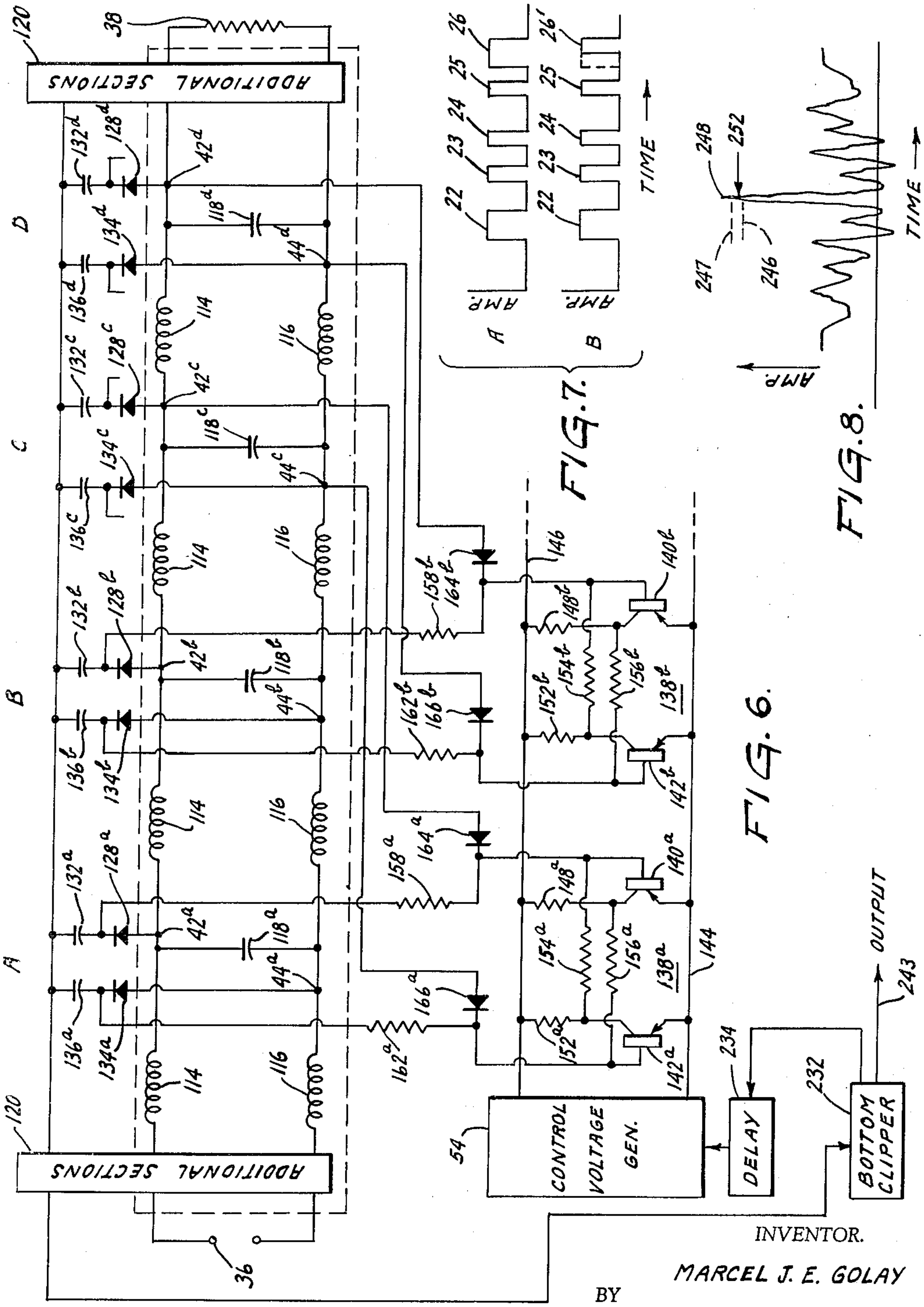
FIG. 6 is a diagram similar to FIG. 4 which illustrates a second preferred embodiment of the present invention.
FIGS. 7 and 8 are waveforms which are illustrative of the operation of the embodiment of FIG. 6.

In a character recognition system the character to be recognized may undergo a gradual change with time. In an ordinary system a point would be reached when the desired character would not be recognized. It would then be necessary to reexamine the character and to reorganize the coupling arrangement to take into account the changed form of the character. FIG. 6 illustrates a system in which the coupling arrangement is continually reset to correspond to the present configuration of the character to be recognized. The circuit shown in FIG. 6 is generally similar to the circuit shown in FIG. 4 and like parts in the two figures are identified by the same reference numeral. For the sake of simplicity the phase equalizing capacitors 119 are not shown in FIG. 6.

It will be seen that the circuit of FIG. 6 differs from the circuit of FIG. 4 in that the setting diodes $164^a$ and $164^b$ are connected to taps $42^c$ and $42^d$ in FIG. 6 instead of taps $42^a$ and $42^b$ as in FIG. 4. Similarly, setting diodes $166^a$ and $166^b$ are connected to taps $44^c$ and $44^d$. No change has been made in the connection of coupling diodes $134^a$, $134^b$ or $128^a$ and $128^b$. Only the coupling circuits between taps $42^c$, $44^c$, $42^d$ and $44^d$ are shown in FIG. 6. The control circuits for these coupling means may be the same as shown in sections A and B of this figure.

The trigger generator 12 and switch 56 of FIG. 4 have been replaced by a bottom clipper 232 and delay circuit 234. Bottom clipper 232 may take the form shown in FIG. 1A, for example. Delay line 234, which connects the output of the bottom clipper 232 to the synchronizing input of control voltage generator 54, has a delay approximately equal to the delay from tap $42^a$ to tap $42^c$ less the delay in recognition which occurs in bottom clipper 232 and the delay in resetting introduced by control voltage generator 54.

In a character recognition circuit of the type mentioned above, the output of the scanning amplifier (not shown) is coupled to the input terminals 36.

The operation of FIG. 6 will be explained with reference to the waveforms of FIGS. 7 and 8.

Waveform A of FIG. 7 is the same as the waveform shown in FIG. 2A and represents the waveform obtained by scanning the letter M of FIG. 2. The waveform 240 shown in FIG. 8 is the same as the one shown in FIG. 3 and represents the signal appearing on output bus 48 as a result of the applicaiton of waveform A of FIG. 7 to a properly set matched filter of the type shown in FIG. 1. The clipping level for bottom clipper 232 is set at level 246 shown in FIG. 8. This level is five units down from the maximum peak 248.

Suppose now that, due to some semipermanent defect in the equipment employed to mark the identifying symbol M on the documents 20, the portion of the right-hand upright stroke of the letter M below the line 242 in FIG. 2 is no longer printed. The identifying symbol to be recognized now becomes the defective letter M. The waveform generated by the scanning of this defective letter M is shown in waveform B of FIG. 7. It will be seen that the four unit pulse 26 has been replaced by the two unit pulse 26'. Since this waveform does not correspond exactly to the setting of the active taps of delay line 32, the voltage on output bus 48 will rise only to the level represented by the arrow 252 in FIG. 8. However since this exceeds the clipping level 246, a recognition signal will be generated. The recognition signal is supplied from bottom clipper 232 through delay line 234 to the control voltage generator 54. Upon receipt of this delayed recognition signal, control voltage generator 54 causes the voltage on busses 144 and 146 to vary as shown by waveforms A and B of FIG. 5. This will cause all of the setting diodes (of which only diodes $166^a$, $166^b$, $164^a$ and $164^b$ are shown in FIG. 6) to become unblocked. The bistable circuits $138^a$ and $138^b$ will now be set in accordance with the signals appearing at taps $42^c$ and $42^d$. Since the delay afforded by delay line 234 and the associated circuits is equal to the delay of two sections of the delay line 32 and since these taps $42^c$ and $42^d$ are two sections down the delay line from taps $42^a$ and $42^b$, the signals then present at taps $42^c$ and $42^d$ are the signals which were at terminals $42^a$ and $42^b$ at the time the recognition signal was initially generated. Thus the tapping arrangement of the delay line 32 will be reorganized to correspond to the pattern shown in waveform B in FIG. 7 instead of their original setting corresponding to waveform A in FIG. 7. This reorganization or resetting operation will occur each time a recognition pulse is generated. That is, the matched filter of FIG. 6 which is initially set to recognize an M will be reset each time an M is recognized by that filter. If there has been no change in the character between successively generated recognition signals there will be no change in the setting of the bistable circuits 138. However if the character has changed, the taps on the delay line will be changed accordingly and the matched filter will "track" the changes in the character. The only limitation on the system is that the change in the character must be gradual enough so that the maximum amplitude signal appearing on bus 48 when the signal representing the modified character is supplied to terminals 36 does not fall below the clipping level 246.

As a further refinement of the system of FIG. 6, bottom clipper 232 may be modified so that a signal is supplied to delay line 234 only if the peak amplitude of the signal lies between the levels 246 and 247. If this is done the control voltage generator will be activated only if there is an appreciable change in the shape of the character to be recognized. The signal supplied to delay line 234 may be supplied also to an alarm circuit (not shown) which will indicate that a change has occurred in the character to be recognized. A signal will be supplied to output 243 anytime the peak amplitude of the signal exceeds clipping level 246 as before.

Figure 9:
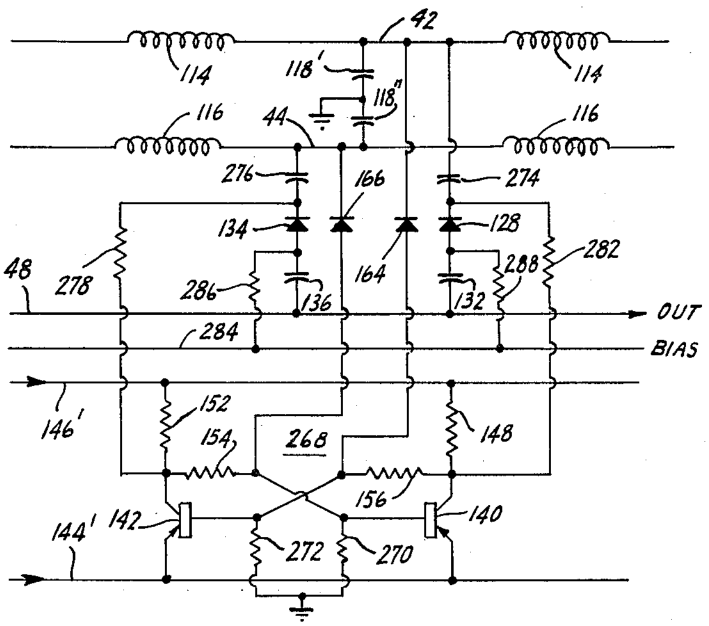
FIG. 9 is a schematic diagram of one section of still another embodiment of the present invention.

FIG. 9 illustrates a slightly modified form of the tap switching circuit shown in FIG. 4. Only one section is shown since the circuits are the same for each section. Parts in FIG. 9 corresponding to like parts in FIG. 4 have been identified by the same reference numeral. Since only one stage is shown in FIG. 9, the superscript letters *a* and *b* which form part of the reference numerals of FIG. 4 have been omitted in FIG. 9. The shunt capacitor 118 which is shown as a single capacitor in FIG. 4 is shown as two equal capacitors 118' and 118'' in series in FIG. 9. The center tap of these two capacitors is grounded. The bistable circuit 268 shown in FIG. 9 is similar to the bistable circuit 138 of FIG. 4. In the circuit of FIG. 9 the setting diode 166 is again connected between tap 44 and the base of transistor 140. However in the circuit of FIG. 9 the cathode terminal of diode 166 is connected to the tap 44. The reason for this is that busses 144' and 146' are supplied with negative potentials rather than the positive potentials assumed for the circuit of FIG. 4. A resistor 270 is connected from the base of transistor 140 to ground. As will be seen as the description proceeds the bias developed across resistor 270 when diode 166 is conducting assists in establishing the desired state of conduction in bistable circuit 268 when operating potentials are supplied to leads 144' and 146'. Setting diode 164 is connected between tap 42 and the base of transistor 142. Again diode 164 is reversed from the connection shown in FIG. 4. A resistor 272, which has a function similar to that of resistor 270, is connected from the base of transistor 142 to ground. Coupling diodes 128 and 134 correspond to similarly numbered elements in FIG. 4. The connection of diodes 128 and 134 are reversed from the connections shown in FIG. 4. Again this is due to the use of negative supply voltages on leads 144' and 146' instead of the positive voltages applied to the circuit of FIG. 4.

The cathode of diode 128 is coupled to tap 42 through a direct current blocking capacitor 274. A similar blocking capacitor 276 is placed between the cathode of diode 134 and tap 44. The cathode terminal of diode 134 is connected to the collector of transistor 142 by way of resistor 278. The cathode of diode 128 is connected to the collector of transistor 140 by way of resistor 282. The anode of diode 134 is connected to a bus 284 by way of resistor 286. As will be explained in more detail presently, bus 284 is maintained at a fixed negative potential. A similar connection is made from the anode of diode 128 to bus 284 by way of resistor 288.

Figure 10:
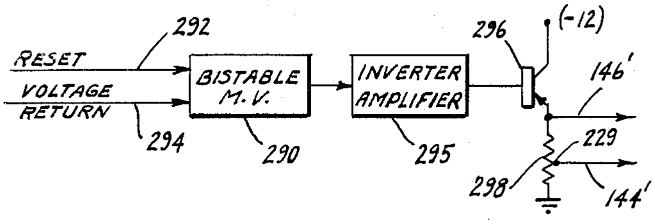
FIG. 10 is a circuit for supplying operating voltages to the circuit of FIG. 9.
Figure 11:
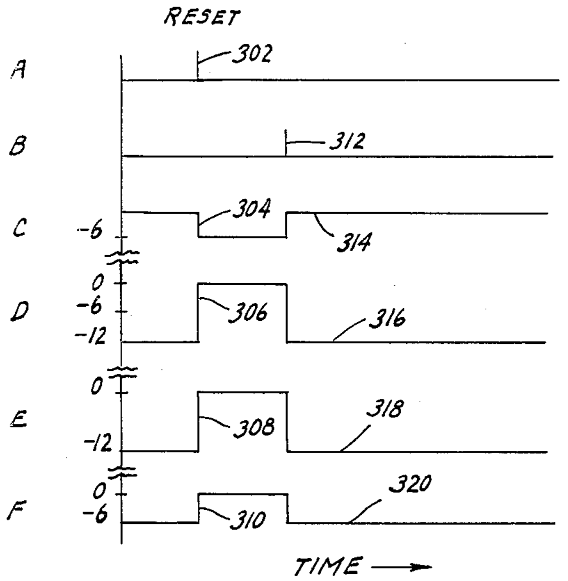
FIG. 11 is an amplitude versus time plot of signals present at various points in the circuit of FIG. 10.

A suitable control voltage generator for supplying control potentials to lead 144' and 146' is shown in FIG. 10. The voltages at selected points in the circuit of FIG. 10 are illustrated in FIG. 11. In FIG. 10 a bistable multivibrator 290 is provided with two inputs 292 and 294. Multivibrator 290 is a circuit of the type which will be set to one condition by a pulse supplied at input 292 and will remain in that condition until a pulse is supplied to input 294. The output of multivibrator 290 is supplied by way of inverter amplifier 295 to the base of a transistor 296. The collector of transistor 296 is returned to a fixed negative potential and the emitter is returned to ground through a load resistor 298 thus forming a conventional emitter follower stage. The bus 146' of FIG. 9 is connected to the emitter of transistor 296 while the bus 144' is connected to an intermediate tap 299 on resistor 298.

The reset pulse supplied to input 292 of FIG. 10 is shown at 302 in waveform A of FIG. 11. Pulse 302 may be generated in any convenient fashion. For example, it may be generated at a particular time by a gating circuit such as the one shown in FIG. 4A or it may be generated in response to a recognition signal as shown in FIG. 6. The output signal of multivibrator 290 is represented by waveform C of FIG. 11. The reset pulse 302 causes the output of multivibrator 290 to drop as shown at 304 from approximately zero potential to approximately −6 volts. The voltages mentioned herein are given by way of example only but represent voltages which were found to be satisfactory in practice.

The change in voltage in the output of multivibrator 290 causes the potential at the output of inverter amplifier 295 to rise from −12 volts to approximately zero volts as shown at 306 in waveform D of FIG. 11. Waveform D represents the output signal of inverter amplifier 295. A similar change in voltage from approximately −12 volts to zero volts occurs at the emitter of transistor 296 as shown at 308 in waveform E which represents the signal at the emitter of transistor 296 and hence the signal supplied to bus 146'. Waveform F of FIG. 11 represents the change in voltage on bus 144'. Since in the embodiment represented in FIG. 10 the bus 144' is connected to the mid-tap 299 of resistor 298, the rise 310 in waveform F is only one half the rise at bus 146' or 6 volts as shown in waveform F of FIG. 11. As shown by waveforms E and F in FIG. 11, busses 144' and 146' are both at zero potential in the interval following a reset pulse. Thus neither side of the bistable circuit 268 will be conducting.

The voltage return pulse 312 shown in waveform B of FIG. 11 returns bistable multivibrator 290 to its original state. Thus the voltage at the output of multivibrator 290 returns to ground potential as shown at 314 in waveform C. The output of inverter 295 returns to −12 volts as shown at 316 in waveform D. This returns bus 146' to −12 volts as shown at 318 in waveform E and bus 144' to −6 volts as shown at 320 in waveform F.

The voltage return pulse 312 may be generated in any convenient fashion. It may be generated entirely independently of the reset pulse 302 or it may be the reset pulse 302 delayed by a sufficient amount to permit bistable circuit 268 of FIG. 9 to be completely deactivated.

The state of conduction of bistable circuit 268 when operating voltages are returned to busses 144' and 146' is determined by the relative polarities of taps 42 and 44 at the instant the voltage return pulse 312 is generated. Assume for the moment that tap 42 is at a positive potential and that tap 44 is at a corresponding negative potential. In the instant before operating voltages are supplied to circuit 268 the base of transistor 142 is at ground potential and diode 164 is cut off by the positive potential at its cathode. However, the base of transistor 140 will be at a negative potential owing to the current flow through resistor 270 and diode 166. Therefore, upon the reapplication of the operating potentials to the bistable circuit 268, transistor 140 will conduct and transistor 142 will be cut off. Thus the cathode of diode 128 is held at a potential of approximately −6 volts by the potential on the collector of the conducting transistor 140 while the cathode of diode 134 is held at approximately −12 volts, the potential of the collector of non-conducting transistor 142. Bus 284 is maintained at a potential which will ensure that diodes 128 and 134 are always back biased. In the example chosen for illustration herein a bias potential of −5 volts was found to be satisfactory for bus 284. Thus diode 128 will be back biased by approximately one volt and have a relatively high capacitance. At the same time diode 134 is back biased by approximately −7 volts and hence has a relatively low capacitance. A relatively high degree of coupling will be afforded between tap 42 and output bus 48 by way of diode 128 and capacitors 274 and 132. Similarly there will be relatively little coupling afforded between tap 44 and output bus 48. The use of the separate bus 284 for establishing the steady value of bias on diodes 128 and 134 simplifies the choice of operating potentials for the bistable circuit 268.

The diodes 164 and 166 may be connected to different taps than coupling diodes 128 and 134 as shown in FIG. 6 if desired. The circuit of FIG. 9 may also be provided with multiple sets of coupling circuits feeding multiple output buses as shown in FIG. 1B.

Figure 12:
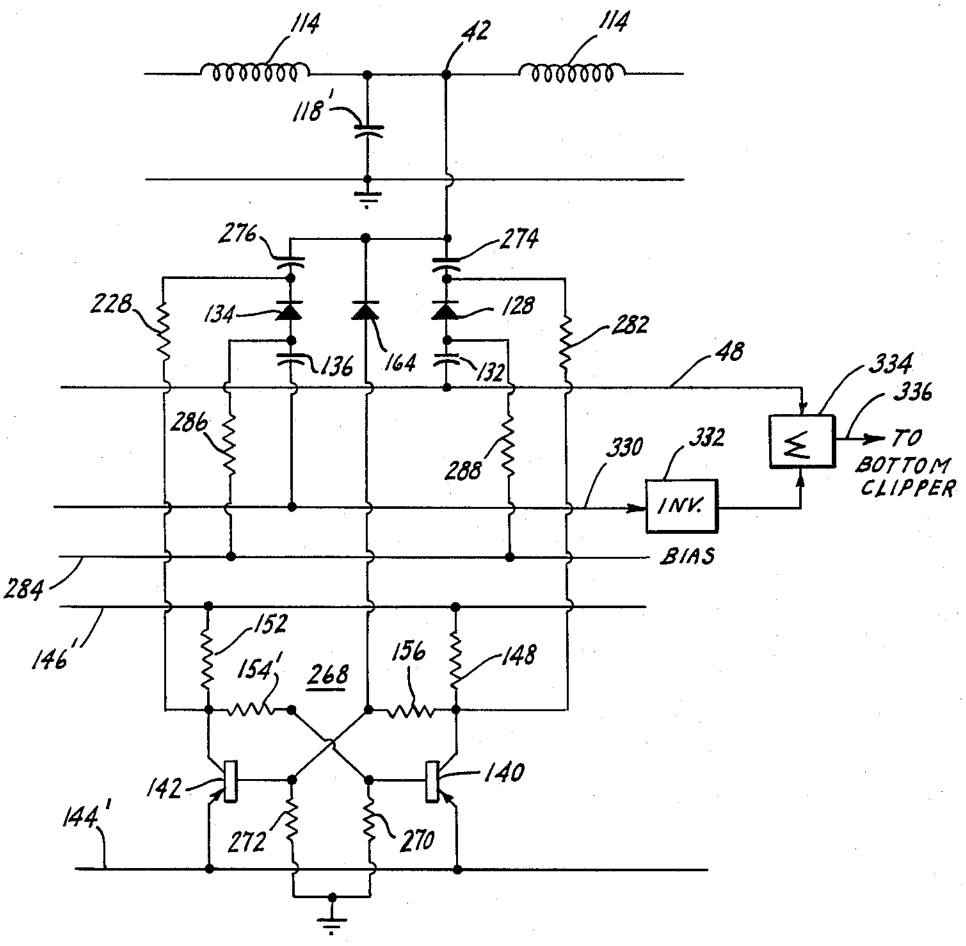
FIG. 12 is a schematic diagram of one section of an embodiment of the invention which employs an unbalanced delay line.

The embodiments of the invention shown in FIGS. 4, 6 and 9 employ balanced delay lines. FIG. 12 is a schematic diagram of one section of an embodiment of the invention which employs an unbalanced delay line. The embodiment shown in FIG. 12 is generally similar to the embodiment of FIG. 9 and like parts in two figures have been identified by the same reference numerals. The unbalanced delay line shown in FIG. 12 corresponds to the upper half of the balanced delay line shown in FIG. 9. The connections between setting diode 164, coupling diode 128, tap 42 and bistable circuit 268 remain unchanged. Capacitor 132 is coupled with output bus 48 as before. The coupling network comprising capacitors 136 and 276 and variable capacitance diode 134 is connected between the tap 42 and a second output bus 330. The connections from the anode and cathode terminals of coupling diode 134 to bus 284 and bistable circuit 286 are the same as those of FIG. 9. Only one setting diode 164 is employed in the circuit of FIG. 12. Resistor 154′ of bistable circuit 268 is made slightly smaller than resistor 156 in order to ensure that the bistable circuit 268 will be in the state in which transistor 140 is conducting if no signal is coupled through diode 164 at the time the potentials are reapplied to busses 144′ and 146′. Output bus 330 is coupled through an inverter 332 to one input of an adder circuit 334. Output bus 48 is connected to the second input of adder 334. The output connection 336 may be connected to a bottom clipper as shown in FIGS. 1 and 6.

The operation of the circuit of FIG. 12 is as follows:

If tap 42 is at a positive potential at the time operating potentials are restored to buses 144′ and 146′ no signal will be coupled through setting diode 164 and transistor 140 will conduct owing to the intentional slight unbalancing of the bistable circuit 268. This will cause a relatively high degree of coupling to be provided between tap 42 and bus 48. Very little coupling will exist between tap 42 and output bus 330.

If tap 42 is at a negative potential at the time bistable circuit 268 is to be reset, setting diode 164 will conduct thus placing the base of transistor 142 at a negative potential. The effect of the conduction through setting diode 164 will overcome the unbalance of the bistable circuit produced by the unequal resistors 154′ and 156 and will cause transistor 142 to conduct when operating potentials are reapplied to busses 144′ and 146′. When bistable circuit 268 is in the state in which transistor 142 is conducting, there will be very little coupling between tap 42 and output bus 48 but a relatively high degree of coupling between tap 42 and output bus 330. The signal inversion producted by inverter 332 of FIG. 12 takes the place of the signal inversion which normally occurs between the two halves of a balanced delay line. Thus the output signal on line 336 will be equivalent to that supplied by active taps 44 in the preceding embodiments.

In the foregoing description of the invention it has been assumed that each section of the delay line has a signal controllable coupling means associated therewith. However it is to be understood that, in the interest of economy but at a slight sacrifice in flexibility, one or more of the sections of the delay line may be provided with fixed coupling circuits or manually controllable coupling circuits. In certain embodiments of the invention it may be desirable to provide coupling only to alternate sections or to only a selected pattern of sections.

It is obvious that the invention is not to be limited to the specific application chosen for illustration herein but is applicable to all situations in which the connections to taps on a delay line or shift register are to be changed electronically in response to a triggering signal. For example, matched filters of the tapped delay line type are employed also in certain types of secret communications systems. In a typical system of this type the information to be transmitted may be converted to binary form. A pulse code similar to the one shown in FIG. 2A, for example, may be selected to represent a binary "one." A different code may be selected to represent a binary "zero." The number of pulses in each code group will be governed by the degree of security required. The number might be a few tens for low security systems or a few hundreds or a few thousands for higher security systems. These groups of pulses are transmitted in the proper sequence to represent the arrangement of "ones" and "zeros" in the binary intelligence. An ordinary receiver tuned to the frequency of the transmitter would receive only a meaningless jumble of pulses. However the designated receivers of the secret communication system are provided with two matched filters, one having taps set to recognize the "one" code and the other having the taps set to recognize the "zero" code. The first matched filter provides an output signal each time the combination of pulses representing a "one" is received and the second filter provides an output signal each time the combination of pulses representing a "zero" is received. Only one delay line is required, the two filters being formed by coupling the taps 42 and 44 to two separate output busses by way of separately settable coupling circuits as shown in FIG. 1B. Separate control voltage generators 54 are required since the two sets of coupling circuits are reset or reorganized at different times. By combining the outputs of the two matched filters the original binary intelligence is recreated at the receiver.

The use of the pulse codes to represent "ones" and "zeros" provides a relatively high degree of security against the unauthorized reception of the transmitted intelligence. Still further protection against unauthorized reception of the transmitted intelligence can be achieved if the codes representing "ones" and "zeros" are continually changed in a random manner as the message is being transmitted. The tap changing systems of the prior art are generally too slow in their operation to permit a change to be made in the code while the message is being transmitted. Furthermore the prior art tap changing means require advance knowledge at the receiver of the manner in which the code is to be changed at the transmitter. Thus only infrequent, preprogrammed changes in the code may be employed. However in systems subject to interception but not subject to jamming, it is possible to construct a simple matched filter as shown in FIG. 6 which will respond to a code which is continually changing in a random manner. Only knowledge of the original code is required at the receiver. No advance information on the manner in which the code is to be changed is required.

It has been assumed that the coupling networks, for example networks $134^a$–$136^a$ and $134^b$–$136^b$ in FIG. 4 provide the same degree of coupling when set to couple their respective taps to the output bus 48. If desired, the contribution from each tap may be weighted in a preselected manner by causing the effective capacitance of certain coupling paths to be selected multiples of the capacitance of other paths. As a further modification variable inductor or variable resistance coupling means may be substituted for the variable capacitance coupling means shown herein.

Therefore, while the invention has been described with reference to preferred embodiments thereof, it will be apparent that various modifications and other embodiments thereof will occur to those skilled in the art within the scope of the invention. Accordingly I desire the scope of my invention to be limited only by the appended claims.

I claim:

1. A signal processing system comprising a signal translating circuit, said signal translating circuit including input terminals, a plurality of output taps, and means for causing successive portions of the signal supplied to said input terminals at successive times to be supplied simultaneously to respective ones of said output taps, said signal processing system further comprising an output circuit, a plurality of coupling means coupling said signal translating circuit to said output circuit, each of said coupling means being associated with a respective one of said taps, each of said coupling means being operative in one state to provide a relatively high degree of signal coupling between its associated tap and said output circuit and in a second state to provide a relatively low degree of signal coupling between its associated tap and said output circuit, a control means connected to each of said coupling means, and a source of intermittently generated control signals connected to each of said control means, each of said control means being jointly responsive to said intermittently generated control signals and the signal present at a respective one of said taps for setting the associated coupling means to a state determined by the polarity of the potential at said last-mentioned one of said taps each time said intermittently generated control signals are produced.

2. A signal processing system according to claim 1 wherein said signal translating circuit supplies a given portion of the signal supplied to said input terminals to both the tap operatively associated with a control means and the tap with which the coupling means associated with that control means is, in turn, associated, said signal being supplied to said last-mentioned tap associated with said coupling means at least as soon as it is supplied to said tap with which the respective control means is associated.

3. A signal processing system in accordance with claim 2 wherein a coupling means and its associated control means are coupled to the same tap.

4. A signal processing system in accordance with claim 2 wherein the taps to which said control means and said coupling means are connected are selected so that said signal is supplied to said last-mentioned tap associated with said coupling means prior to the time that it is supplied to said tap operatively associated with said control means.

5. A signal processing system comprising a signal translating circuit, said signal translating circuit including input terminals, a plurality of sets of output taps, and means for causing successive portions of the signal supplied to said input terminals at successive times to be supplied simultaneously to respective ones of said sets of output taps, said signal processing system further comprising an output circuit, a plurality of pairs of two terminal signal coupling means, the two coupling means of each pair having one common terminal, each of said pairs of coupling means being connected between a respective set of taps and said output circuit, each of said pairs of coupling means when set to one of two states providing a high degree of coupling through a first coupling means of said pair and a low degree of coupling through the second coupling means of said pair and when set to the other of said two states providing a relatively low degree of coupling through said first coupling means of said pair and a relatively high degree of coupling through said second coupling means of said pair, a control means for and connected to each pair of coupling means, and a source of intermittently generated control signals connected to each of said control means, each of said control means being jointly responsive to the signal at one set of said taps and said intermittently generated control signals supplied by said source for setting said pair of associated coupling means to a state determined by the potential of said last-mentioned set of taps at the time said intermittently generated control signals are produced.

6. A signal processing system in accordance with claim 5 wherein each of said sets includes one tap and wherein the two coupling means of each pair are connected to the same tap.

7. A signal processing system in accordance with claim 5 wherein said output circuit includes an output bus and each of said sets of output taps includes two taps and wherein the two coupling means of each pair are connected to said output bus.

8. A signal processing system comprising a signal translating circuit, said signal translating circuit including input terminals, a plurality of pairs of output taps, and means for causing successive portions of the signals supplied to said input terminals at successive times to be supplied simultaneously to respective pairs of said output taps, the signals appearing at the two taps of each of said pairs being balanced with respect to a point of reference potential, said signal processing system further comprising an output bus, a plurality of coupling means coupling said signal translating circuit to said output bus, each of said coupling means being associated with a respective pair of said taps, each of said coupling means being operative in one state to provide a relatively high degree of signal coupling between one tap of the associated pair and said output bus and relatively little coupling between the other tap of the associated pair and said output bus and operative in a second state to provide relatively high degree of coupling between the second tap of said associated pair and said output bus and relatively low degree of signal coupling between the first tap of the associated pair and said output bus, a control means for and connected to each of said coupling means, and a source of intermittently generated control signals coupled to each of said control means, each of said control means being jointly responsive to said intermittently generated control signals and the signal potential of a respective pair of said taps for setting the associated coupling means to a state determined by the potential at one of said last-mentioned pair of taps each time said intermittently generated control signals are produced.

9. A signal processing system comprising in combination a delay line provided with input terminals, output terminals in a plurality of successive taps, a matched terminating impedance coupled to said output terminals and providing a substantially nonreflective termination for said delay line, an output bus, a plurality of signal responsive coupling means, coupled to said delay line and said output bus, each of said coupling means being associated with a respective one of said taps, each of said signal responsive coupling means being responsive in one state to provide a relatively high degree of signal coupling between its associated tap and said output bus and in a second state to provide a relatively low degree of signal coupling between its associated tap and said output bus, a control means for and connected to each of said signal responsive coupling means, and a source of intermittently generated control signals connected to each of said control means, each of said control means being jointly responsive to said intermittently generated control signals and the signal potential of a respective one of said taps for setting the associated signal responsive coupling means to a state determined by the potential at said last-mentioned one of said taps each time said intermittently generated control signals are produced.

10. A signal processing system according to claim 9 wherein said tap with which each of said control means is associated is at least as distant from said input terminals as the tap with which the coupling means associated with that control means is, in turn, associated.

11. A signal processing system in accordance with claim 10 wherein said intermediate tap with which each of said control means is associated is the same tap as the tap with which the coupling means associated with that control means is, in turn, associated.

12. A signal processing system in accordance with claim 10 wherein said intermediate taps with which each of said control means is associated is more distant from said input terminals than the tap with which the coupling means associated with that control means is, in turn, associated.

13. In combination, a multisection delay line, selected sections of said delay line being provided with at least one output tap, an output bus, a signal responsive coupling means for each of said taps, each of said signal responsive coupling means being responsive in one state to provide a high degree of coupling between its associated tap and said output bus and in another state to provide relatively little coupling between said associated tap and said output bus, a control means for each of said signal responsive coupling means, and a source of intermittently generated control signals, each of said control means being jointly responsive to the potential at one of said taps and said intermittently generated control signals supplied by said source for setting the associated signal responsive coupling means to a state determined by the polarity of the potential at said last-mentioned one of said taps at the time said intermittently generated control signals are produced.

14. In combination, a multisection balanced delay line, selected sections of said delay line being provided with paired output taps, the signals appearing at said output taps being balanced with respect to a point of reference potential, an output bus, a signal responsive coupling means for each of said taps, the two coupling means associated with the two taps of a section forming a pair, each of said signal responsive coupling means being responsive when set to one of two states to provide a high degree of coupling between its associated tap and said output bus while the other coupling means of said pair provides relatively little coupling between said associated tap and said output bus and vice versa when set to the other of said two states, a control means for each pair of signal responsive coupling means, and a source of intermittently generated control signals, each of said control means being jointly responsive to the potentials at one pair of said taps and said intermittently generated control signals supplied by said source for setting said pair of associated signal responsive coupling means to a state determined by the relative potentials of said last-mentioned pair of taps at the time said intermittently generated control signals are produced.

15. In combination, a multisection balanced delay line, selected sections of said delay line being provided with paired output taps, the signals appearing at said output taps being balanced with respect to a point of reference potential, an output bus, a signal responsive coupling means for each of said taps, the two coupling means associated with the two taps of a section forming a pair, each of said signal responsive coupling means in one state providing a high degree of coupling between its associated tap and said output bus and in another state providing relatively little coupling between said associated tap and said output bus, a bistable circuit for each pair of signal responsive coupling means, means coupling said bistable circuit to a selected pair of said taps, means for causing the state of conduction of said bistable circuit to be determined at a given command by the relative potentials of the pair of taps to which it is coupled, each bistable circuit being connected to the associated coupling means for supplying state determining signals thereto, said two coupling means of a pair being set always to different states.

16. A a signal processing system comprising a signal translating circuit, said signal translating circuit including input terminals, a plurality of output taps, and means for causing portions of the signals supplied to said input terminals at different times to be supplied simultaneously to respective ones of said output taps, a differently timed portion of said signal being supplied to any given tap in successive time intervals, said signal processing system further comprising an output bus, a plurality of signal responsive coupling means, each of said coupling means being associated with their respective one of said taps, each of said coupling means comprising a variable capacity diode and a capacitor in series combination, and means responsive to signals appearing at selected taps of said translating circuit for applying selected bias potentials to said variable capacity diodes.

References Cited by the Examiner

UNITED STATES PATENTS

| | | | |
|---|---|---|---|
| 2,687,513 | 8/54 | Lindenblad | 333—32 |
| 2,976,501 | 3/61 | Mattiat | 333—32 |
| 2,976,516 | 3/61 | Taber. | |

MALCOLM A. MORRISON, *Primary Examiner.*

JOHN F. BURNS, *Examiner.*